(12) United States Patent
Nagaratnam et al.

(10) Patent No.: US 7,272,714 B2
(45) Date of Patent: Sep. 18, 2007

(54) METHOD, APPARATUS, AND PROGRAM FOR AUTOMATED TRUST ZONE PARTITIONING

(75) Inventors: Nataraj Nagaratnam, Morrisville, NC (US); Brian Keith Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 10/159,659

(22) Filed: May 31, 2002

(65) Prior Publication Data

US 2003/0233543 A1    Dec. 18, 2003

(51) Int. Cl.
*H04K 1/00*        (2006.01)
*H04L 9/00*        (2006.01)
*G06F 15/16*       (2006.01)
*G06F 1/00*        (2006.01)
*G06F 13/00*       (2006.01)
*H04L 9/08*        (2006.01)

(52) U.S. Cl. .............. 713/156; 713/157; 713/159; 726/1; 709/229

(58) Field of Classification Search ............. 713/156, 713/155, 157, 158, 159; 709/229
See application file for complete search history.

(56) References Cited

U.S. PATENT DOCUMENTS

| | | | |
|---|---|---|---|
| 6,092,201 A | 7/2000 | Turnbull et al. | 713/201 |
| 6,134,550 A | 10/2000 | Van Oorschot et al. | 707/9 |
| 6,178,505 B1 | 1/2001 | Schneider et al. | 713/168 |
| 6,865,674 B1 * | 3/2005 | Mancini et al. | 713/157 |
| 2003/0070070 A1 * | 4/2003 | Yeager et al. | 713/157 |
| 2006/0041929 A1 * | 2/2006 | Della-Libera et al. | 726/1 |

FOREIGN PATENT DOCUMENTS

| | | | |
|---|---|---|---|
| JP | 2001237820 A | | 8/2001 |
| JP | 2006148454 A | * | 6/2006 |
| WO | WO0171554 A2 | | 9/2001 |
| WO | WO0182038 A2 | | 11/2001 |

OTHER PUBLICATIONS

Stephanos Androutsellis-Theotokis, Diomidis Spinellis, "A survey of peer-to-peer content distribution technologies", ACM Computing Surveys (CSUR), Dec. 2004, ACM Press, vol. 36 Issue 4, pp. 1-37.*

(Continued)

*Primary Examiner*—Matthew Smithers
*Assistant Examiner*—Courtney D Fields
(74) *Attorney, Agent, or Firm*—Duke W. Yee; A. Bruce Clay; Mari Ann Stewart

(57) ABSTRACT

An automated mechanism is provided for generating and distributing appropriate certificates for end entities in a distributed public key infrastructure environment based on trust relationships between the endpoints. Policies between trust zones are specified as an arbitrary graph, referred to as a trust graph. A password is assigned to a trust zone or an individual endpoint by the Certificate Authority. When an endpoint requests a certificate using the appropriate password, the certificate authority uses this graph to generate the appropriate certificates for the endpoint. The distribution of certificates is automated using the Certificate Management Protocol.

33 Claims, 5 Drawing Sheets

OTHER PUBLICATIONS

Herzberg et al., "Access Control Meets Public Key Infrastructure, Or: Assigning Roles to Strangers", Proceedings 2000 IEEE Symposium on Security and Privacy. S&P 2000, pp. 2-14, Published: Los Alamitos, CA, USA, 2000, ix+256 pp.

Perlman et al., "An Overview of PKI Trust Models", IEEE Network, Nov./Dec. 1999, pp. 38-43.

ICA Study Group Report, "Trusted Services and PKI", ICA Information, No. 69, Feb. 2000, pp. 1-47.

Gunter et al., "Policy-Directed Certificate Retrieval", Software-Practice and Experience, vol. 30, No. 15, Dec. 2000, pp. 1609-1640.

IBM Publication, "Certificate Management in WebSphere", 2001, pp. 1-9.

* cited by examiner

FIG. 1
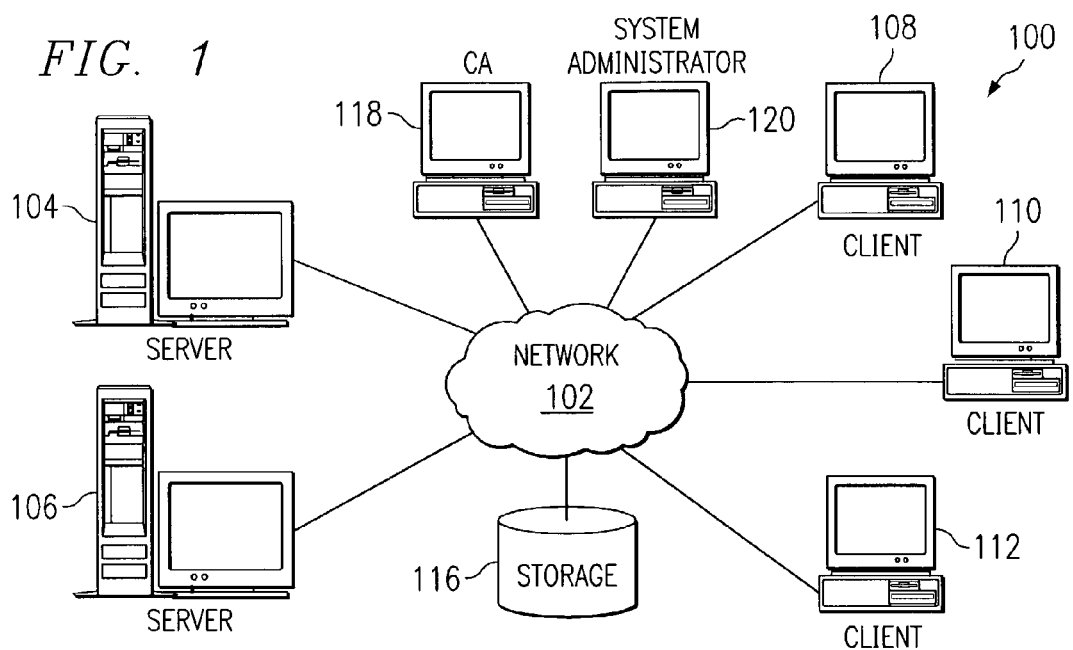
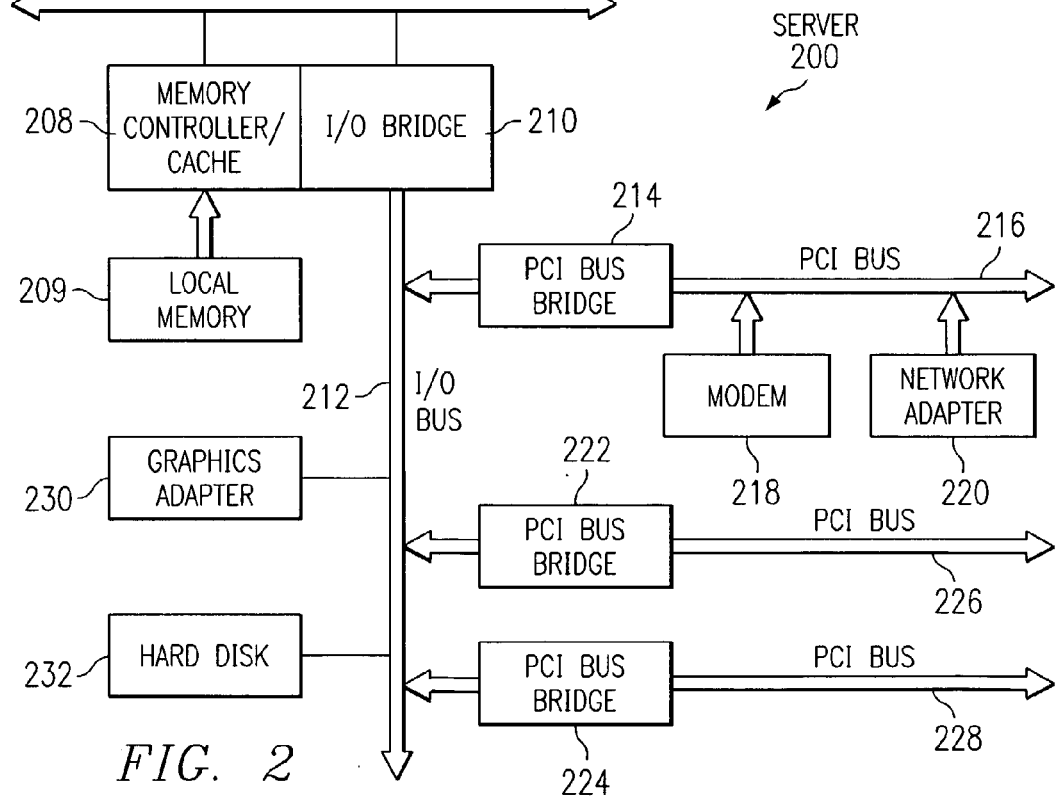
FIG. 2

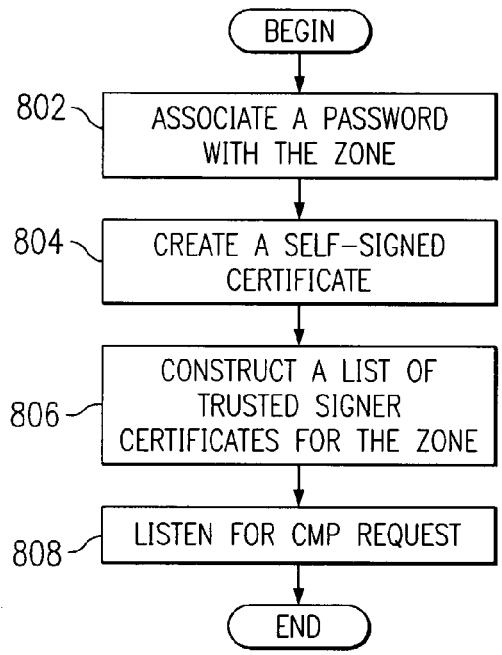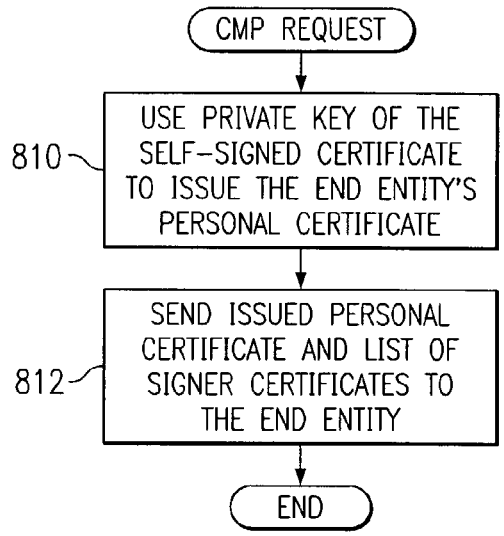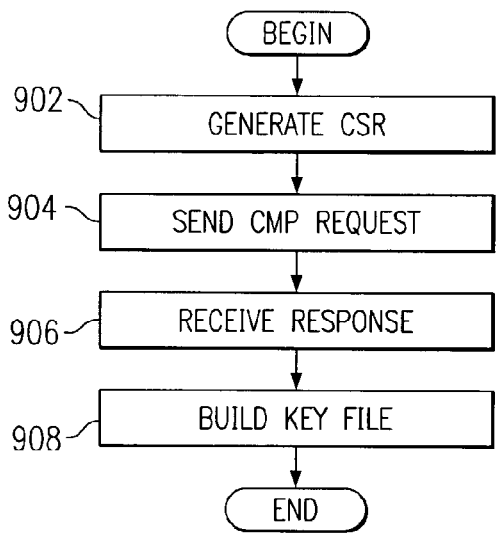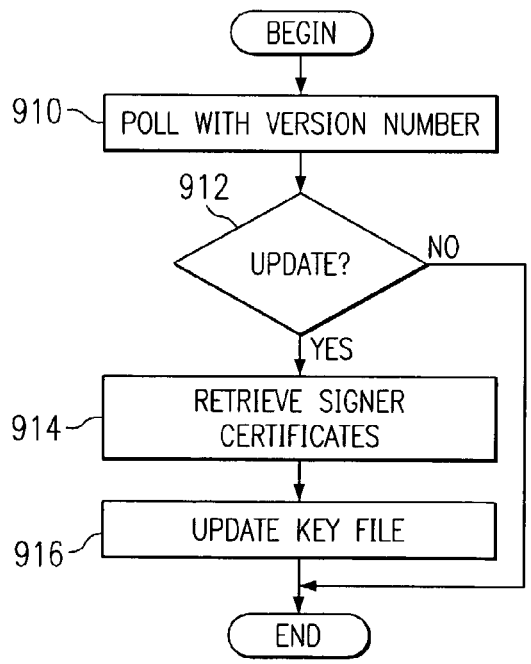

METHOD, APPARATUS, AND PROGRAM FOR AUTOMATED TRUST ZONE PARTITIONING

BACKGROUND OF THE INVENTION

1. Technical Field

The present invention relates to data processing and, in particular, to public key infrastructures. Still more particularly, the present invention provides a method, apparatus, and program for automated trust zone partitioning in a public key infrastructure.

2. Description of Related Art

Public key infrastructure (PKI) is a secure method for exchanging information. A PKI uses an asymmetric encryption method, also known as the "public/private key" method, for encrypting identifications, documents, and messages. PKI starts with a Certificate Authority (CA), which issues digital certificates that authenticate the identity of people and organizations over a network, such as the Internet.

The PKI also establishes the encryption algorithms, levels of security and distribution policy to users. Secure sockets layer (SSL) is the most widely used PKI application. Endpoints typically establish an SSL connection by exchanging certificates which are issued by a trusted Certificate Authority. Certificate distribution in a distributed PKI environment continues to be administratively complex.

Therefore, it would be advantageous to provide an improved mechanism for generating and distributing the appropriate certificates for endpoints in a distributed public key infrastructure environment.

SUMMARY OF THE INVENTION

The present invention provides a mechanism for establishing key stores for end points determined by zones that are formed based on trust relationship between the end points. This is achieved by specifying policies between trust zones as an arbitrary graph, referred to as a trust graph. A password is assigned to a trust zone or an individual endpoint by the Certificate Authority. When an endpoint requests a certificate using the appropriate password, the certificate authority uses this graph to generate the appropriate certificates for the endpoint. The distribution of certificates is automated using the Certificate Management Protocol.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which the present invention may be implemented;

FIG. 2 is a block diagram of a data processing system that may be implemented as a server in accordance with a preferred embodiment of the present invention;

FIGS. 8A and 8B are flowcharts illustrating the operation of a Certificate Authority in accordance with a preferred embodiment of the present invention; and FIGS. 9A and 9B are flowcharts illustrating the operation of an end entity in accordance with a preferred embodiment of the present invention.

DETAILED DESCRIPTION OF THE PREFERRED EMBODIMENT

Figure 3:
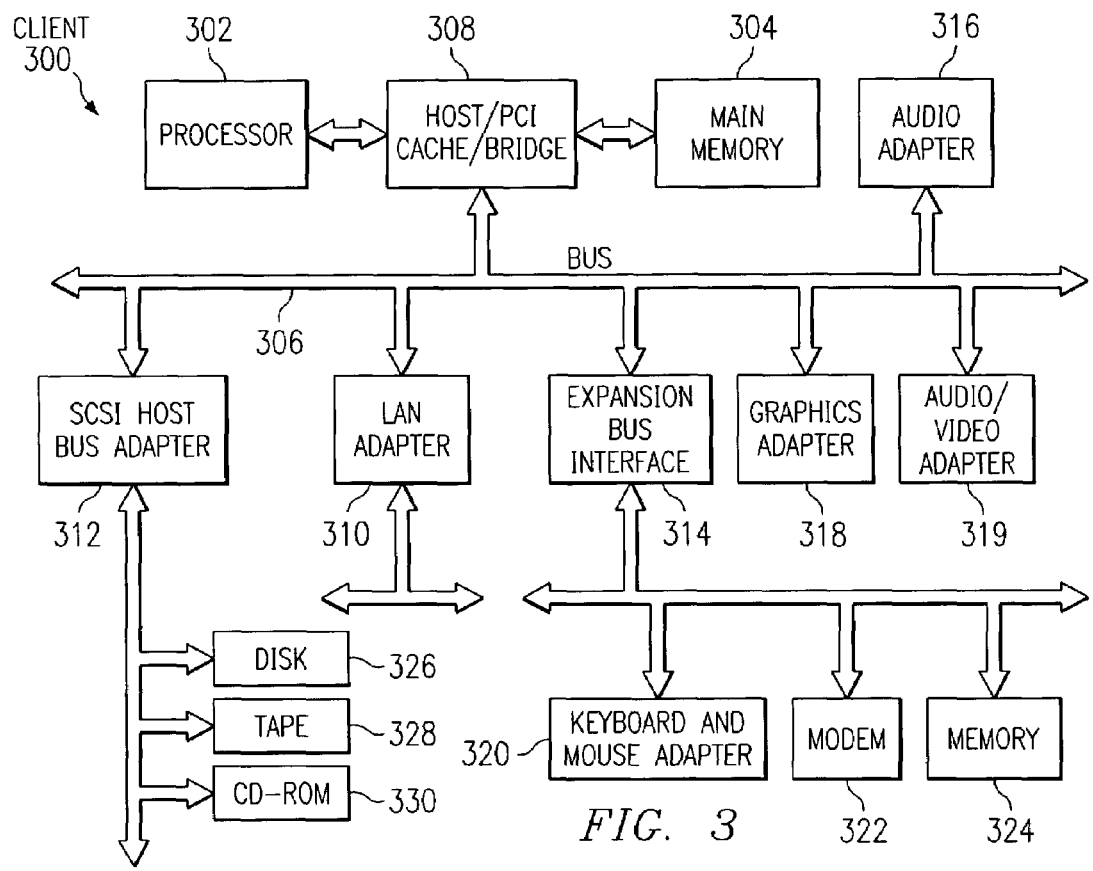
FIG. 3 is a block diagram illustrating a data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 106 are connected to network 102 along with storage unit 116. In addition, clients 108, 110, and 112 are connected to network 102. These clients 108, 110, and 112 may be, for example, personal computers or network computers. In the depicted example, servers 104, 106 provide data, such as boot files, operating system images, and applications to clients 108, 110, 112. Clients 108, 110, 112 are clients to server 104. Network data processing system 100 may include additional servers, clients, and other devices not shown.

Network data processing system 100 also includes Certificate Authority (CA) computer 118 and system administrator computer 120. A Certificate Authority administrator is an organization or individual that issues digital certificates and makes its public key widely available to intended recipients. CA computer 118 is a computer running software used by a Certificate Authority administrator to issue digital certificates. A system administrator is a person who manages a multi-user computer system. The system administrator may set up new computers and software on the network using system administrator computer 120.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN).

FIG. 1 is intended as an example, and not as an architectural limitation for the present invention. For example, network data processing system 100 may include more or fewer clients. Similarly, network data processing system may include more or fewer servers.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, the clients and servers in network data processing system 100 may be configured into multiple trust zones, where the computers within each trust zone may share a common trust policy. There may be multiple end entities on a single client or server machine; furthermore, the end entities on a single machine may be in different trust zones. In accordance with a preferred embodiment of the present invention, relationships between trust zones are specified as an arbitrary graph, referred to as a trust graph. When an endpoint requests a certificate, the CA uses this graph to generate the appropriate signer certificates for the endpoint. The CA also issues a personal certificate to the endpoint.

The signer certificates include the zone's self-signed certificate, the self-signed certificates of all other zones that the zone trusts, and any additional signer certificates associated with the zone. The present invention uses self-signed certificates because many SSL implementations do not handle certificate chains well; however, any certificate which uniquely identifies a trust zone may be used. While the personal certificate for the endpoint includes a private key and a public key, the signer certificates include only a public key.

Figure 4:
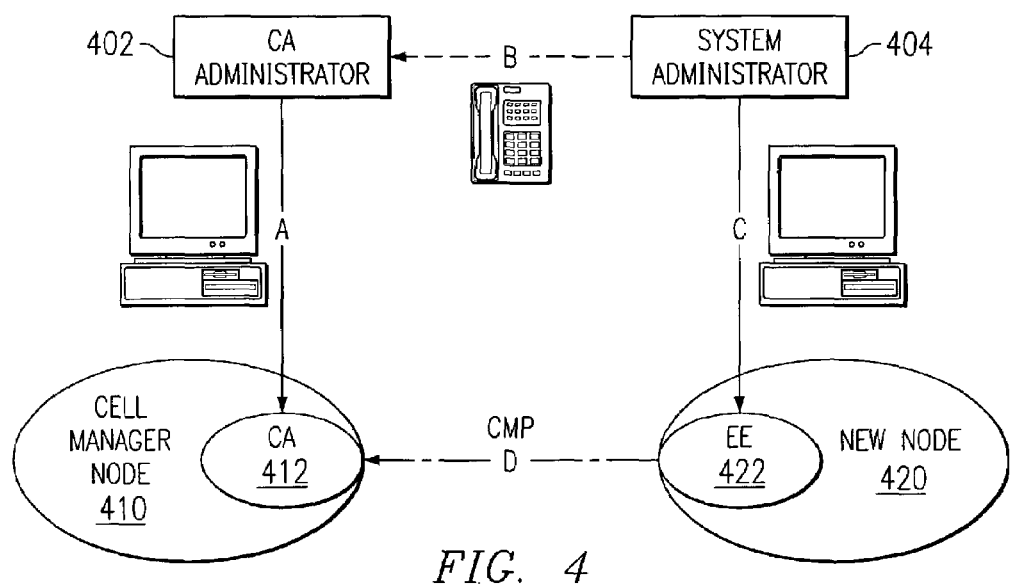
FIG. 4 is a block diagram illustrating an example of automatic key file generation in accordance with a preferred embodiment of the present invention.

With reference now to FIG. 4, a block diagram illustrating an example of automatic key file generation is shown in accordance with a preferred embodiment of the present invention. CA administrator 402 accesses CA 412, running on CA host 410. System administrator 404 may install new node 420, running end entity (EE) 422. An end entity is an entity that requires a certificate, such as an SSL endpoint or a secure Multipurpose Internet Mail Extensions (S/MIME or JavaMail) application.

The primary function of the CA is to securely issue certificates as required. However, the CA may assume other roles depending on the implementation. The EE may communicate with the CA via the standard protocol, Certificate Management Protocol (CMP). In this case, the CA may be any CA that adheres to the standard.

The CA administrator starts the CA (step A). The CA will run on the CA host. When starting the CA, the CA administrator specifies one or more trust zones, as well as a password for each zone. If not previously created, the CA creates a self-signed certificate for each zone. The CA then starts listening for CMP requests on specified ports.

The system administrator then gets a trust zone and its password out of band for a new node (step B). In order to enable SSL for a new installation, the system administrator asks the CA administrator for a zone name and password. This communication may be done by some out-of-band means, such as telephone, secure e-mail, postal mail, etc. Alternatively, the password may be associated with the individual endpoint and exist only for the initialization for the endpoint.

Next, the system administrator runs the end entity (step C). The zone name and password, obtained in step B, are used when running the end entity. After being integrated into the network, the EE is run automatically when the SSL endpoint is initialized. In general, the CA host may have to be specified. Thereafter, the EE generates a key file (step D). The EE sends a CMP initialization request to the CA. The CA then issues a certificate appropriate for the zone that was requested.

The body of the request and the response are encrypted with the zone's password. The request header contains the zone name, so the CA knows which password to use to decrypt the message. No private keys or passwords are communicated over the network. The encryption/decryption of requests provides client authentication while the encryption/decryption of the responses provides server authentication.

Figure 5:
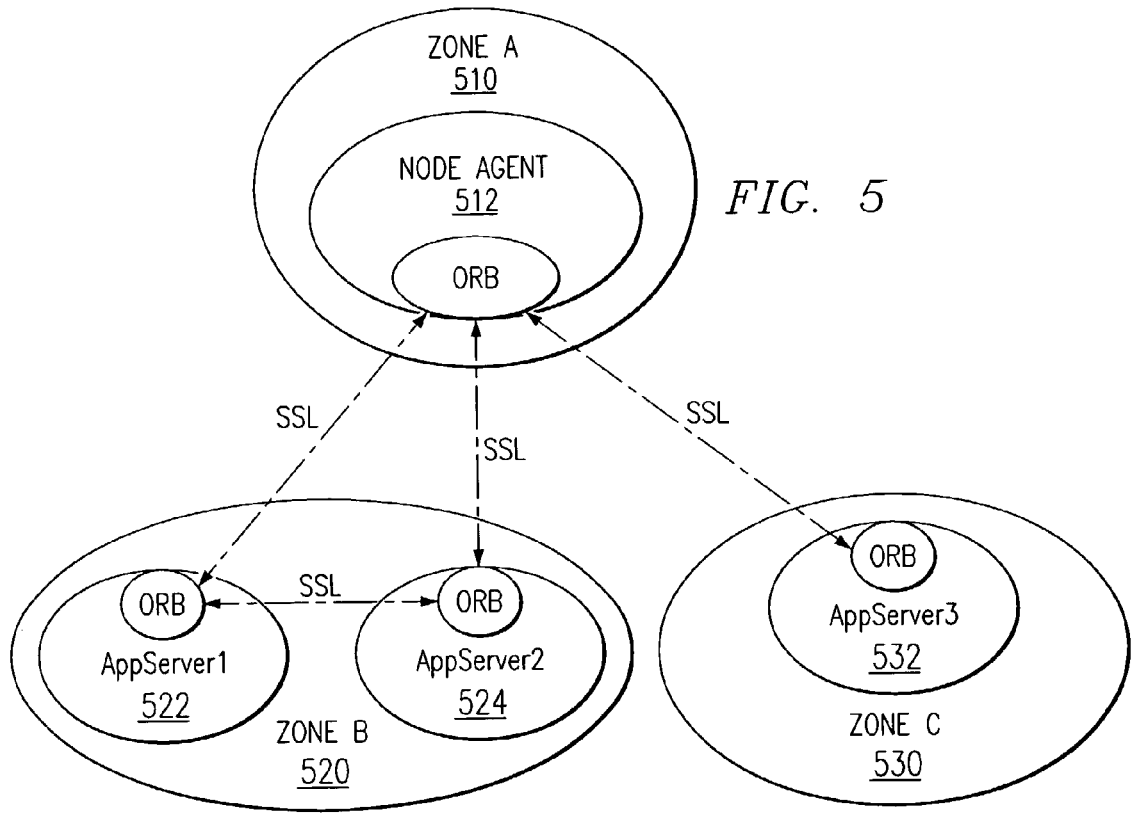
FIG. 5 is a diagram illustrating an example public key infrastructure environment in accordance with a preferred embodiment of the present invention.

With reference to FIG. 5, a diagram is depicted illustrating an example public key infrastructure environment in accordance with a preferred embodiment of the present invention. The PKI infrastructure environment includes node agent 512, which is a common service that application servers will need to talk to, and three application servers, AppServer1 522, AppServer2 524, and AppServer3 532. In the depicted example, the node agent and the application servers communicate via an object request broker (ORB), which is software that handles the communication of messages between objects.

AppServer 1 and AppServer2 can communicate with each other via SSL, but neither can communicate with AppServer3. All application servers communicate with the node agent via SSL. Therefore, there are three trust zones: the node agent is in zone A 510, AppServer1 and AppServer2 are in zone B 520, and AppServer3 is in zone C 530. AppServer1 and AppServer2 share the same trust zone because their trust policies are identical.

More generally, each end entity is a member of a single zone. The relationship between zones can be modeled as an arbitrary directed graph. Each node in the graph represents a trust zone. An arrow from one node to another represents trust in the destination node by the source node. Therefore, one end entity, EE1, trusts another end entity, EE2, if an only if they are in the same zone or there is an arrow from EE1's zone to EE2's zone. Note also that it is possible to compute a minimized trust graph, given the trust relationships between all the end entities. Further optimizations are possible by performing graph analysis and constructing certificates to model a particular type of graph (e.g. a tree).

Figure 6:
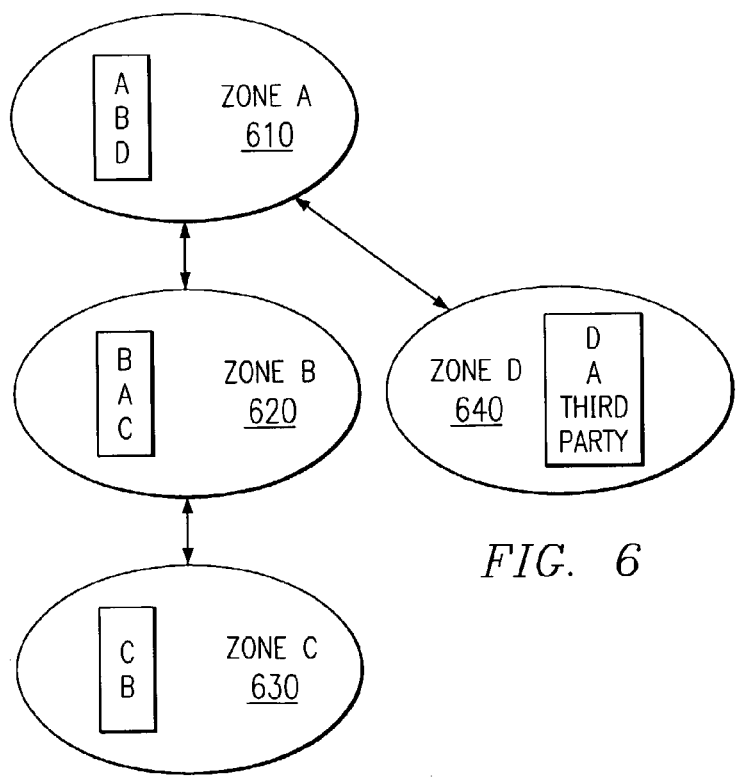
FIG. 6 is an example trust graph in accordance with a preferred embodiment of the present invention.

Turning now to FIG. 6, an example trust graph is shown in accordance with a preferred embodiment of the present invention. There are two types of trusted signers, those taken from a zone's self-signed certificate and those from outside third party CAs, such as VeriSign and Entrust.

Each zone has a unique set of trusted signers associated with it. For example, zone A 610 lists zones A, B, and D as trusted signers; zone B 620 lists zones B, A, and C as trusted signers; zone C 630 lists zones C and B as trusted signers; and, zone D 640 lists zones D and A and a third party Certificate Authority as trusted signers. The self-signed personal certificate and all signer certificates are then used to build appropriate key files for end entities.

It should be noted that mutual trust between zones is not mandatory. For example, it is possible for zone A to trust zone B, but zone B does not trust zone A. Thus, the arrows may be unidirectional. The example shown in FIG. 6 show mutual trust which is the typical case. For other embodiments (e.g. Java Mail), this may not be the case.

Figure 7A:
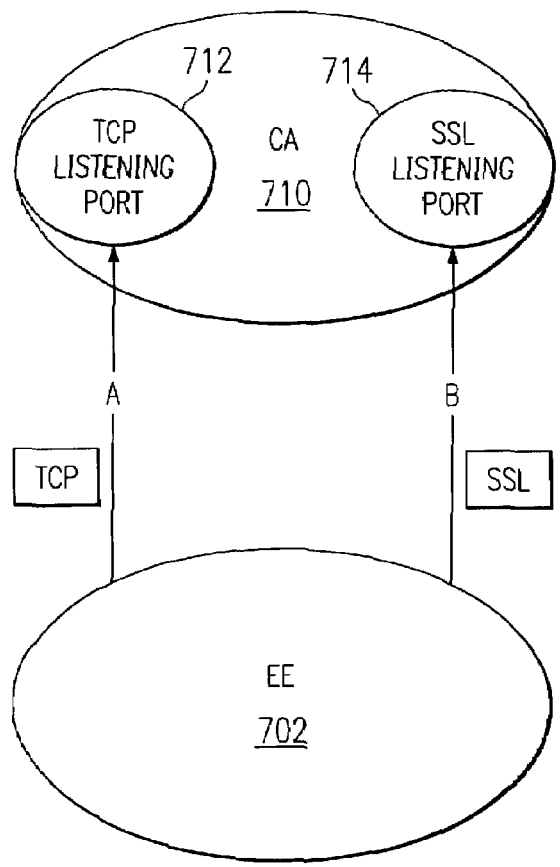
FIGS. 7A and 7B are block diagrams illustrating of an example bootstrap trust zone configuration in accordance with a preferred embodiment of the present invention.
Figure 7B:
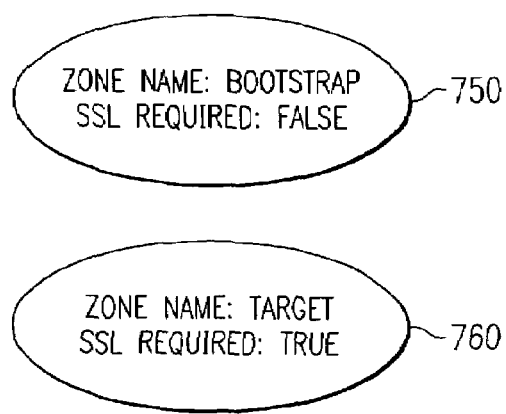

With reference to FIGS. 7A and 7B, block diagrams of an example bootstrap trust zone configuration are illustrated in accordance with a preferred embodiment of the present invention. Particularly, with reference to FIG. 7A, Certificate Authority 710 listens for requests from end entities, such as EE 702, on Transmission Control Protocol (TCP) listening port 712 and Secure Sockets Layer (SSL) protocol listening port 714.

When a node including EE 702 boots up, a request for a list of signer certificates for the bootstrap zone is sent to the CA using TCP (step A). The CA listens for the request on TCP listening port 712 and sends the list of signer certificates to the EE. After receiving the list of signer certificates for the bootstrap zone, the EE is able to communicate with the bootstrap zone over SSL using the signer certificates.

Thereafter, EE 702 sends a request for a target zone to CA 710 over SSL (step B). The CA listens for the request on SSL listening port 714 and sends the list of signer certificates corresponding to the target zone to the EE. After receiving the list of signer certificates for the bootstrap zone, the EE is able to communicate with the bootstrap zone over SSL using the signer certificates.

Turning now to FIG. 7B, an example zone configuration is shown. Trust zone 750 is the bootstrap zone, for which SSL is not required. The bootstrap zone may be used to initialize an end entity. In a preferred embodiment of the present invention, the bootstrap zone does not trust any other zone. Therefore, once a list of signer certificates for the bootstrap zone is received, an end entity must request a list of signer certificates for another target zone, such as trust zone 760, in order to communicate with other zones. As discussed above, the EE may request the list of signer certificates for the target trust zone in a secure fashion using SSL.

In the example shown in FIG. 7B, target trust zone 760 requires SSL. Trust zone 760 may also trust other trust zones in the Public Key Infrastructure. In this example, only the list of signer certificates for the bootstrap zone is obtained using non-SSL communication. All other communication, including the request for the list of signer certificates for other trust zones, is over SSL. Therefore, the non-SSL communication is minimized. Furthermore, the communication over TCP to obtain the signer certificates for the bootstrap zone may be password protected for security.

With reference to FIGS. 8A and 8B, flowcharts are shown illustrating the operation of a Certificate Authority in accordance with a preferred embodiment of the present invention. More particularly, with respect to FIG. 8A, the process begins and associates a password with a zone (step 802). The process creates a self-signed certificate for the zone (step 804) and constructs a list of trusted signer certificates for the zone (step 806). Signer certificates may contain the zone's self-signed certificate, the self-signed certificates of all other zones that the zone trusts, and any additional signer certificates associated with the zone, such as VeriSign, Entrust, or other third party CAs. Thereafter, the process listens for CMP requests (step 808) and ends.

Turning now to FIG. 8B, the process begins in response to receiving a CMP request from an end entity. The process uses the private key of the self-signed certificate to issue the end entity's personal certificate (step 810). Next, the process sends the issued personal certificate and the list of signer certificates to the end entity (step 812). Thereafter, the process ends.

With reference now to FIGS. 9A and 9B, flowcharts illustrating the operation of an end entity are shown in accordance with a preferred embodiment of the present invention. More particularly, with respect to FIG. 9A, the operation of an end entity at initialization is shown. The process begins and generates a CSR (Certificate Signing Request) (step 902). The process then sends a CMP request to the CA (step 904) and receives a response from the CA (step 906). The response may include a personal certificate for the EE and signer certificates for trusted zones. The process builds a key file (step 908) from the signer certificates and ends.

If the trust relationships between zones change, this may change the validity of personal and signer certificates that have been previously returned to end entities. In accordance with a preferred embodiment of the present invention, the end entity may also receive a version number of the zone's trust policy with the response. The end entity can then efficiently poll with the version number to determine if the trust relationships have been updated. If so, new signer certificates may be retrieved. This could minimally be done each time an SSL endpoint is initialized.

FIG. 9B shows the operation polling by an end entity. The process begins and polls the CA with a version number for the trust policy (step 910). A determination is made as to whether the trust policy has been updated (step 912). If the trust policy has not been updated, the process ends. If the trust policy has been updated in step 912, the process retrieves the new signer certificates (step 914), updates the key file (step 916), and ends.

Thus, the present invention solves the disadvantages of the prior art by providing an automated mechanism for generating and distributing appropriate certificates for endpoints in a distributed public key infrastructure environment. The present invention specifies policies between trust zones as an arbitrary graph, referred to as a trust graph. A password is assigned to a trust zone or an individual endpoint by the Certificate Authority. When an endpoint requests a certificate using the appropriate password, the certificate authority uses this graph to generate the appropriate certificates for the endpoint. The distribution of certificates is automated using the Certificate Management Protocol.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a Certificate Authority, for automated trust zone partitioning, comprising:
    defining a Public Key Infrastructure comprising a plurality of trust zones;
    associating a first end entity with a first trust zone within the plurality of trust zones;
    receiving, by the Certificate Authority, a request from the first end entity for a certificate, wherein the request includes a first trust zone name identifying the first trust zone; and
    sending, by the Certificate Authority, a response to the first end entity, wherein the response includes a list of trusted certificates associated with the first trust zone, and wherein the Certificate Authority generates certificates for the first end entity based on a trust graph for the first trust zone.

2. The method of claim 1, wherein each trust zone in the plurality of trust zones has a password associated therewith and wherein the request is encrypted with a first trust zone password for the first trust zone.

3. The method of claim 2, further comprising encrypting the response using the first trust zone password before sending the response.

4. The method of claim 1, further comprising:
    associating an entity password with the first end entity, wherein the request is encrypted with the entity password.

5. The method of claim 4, wherein the response is encrypted with the entity password.

6. The method of claim 1, wherein the list of trusted certificates includes a first certificate for the first trust zone.

7. The method of claim 6, wherein the first certificate includes a public key for the first trust zone.

8. The method of claim 6, wherein the list of trusted certificates further includes a second certificate for a second zone that the first zone trusts.

9. The method of claim 8, wherein the second certificate includes a public key for the second trust zone.

10. The method of claim 6, wherein the list of trusted certificates further includes a certificate for a third party Certificate Authority.

11. A method, in an end entity, for automated trust zone partitioning, comprising:
    sending a request to a Certificate Authority for a certificate, wherein the request includes a trust zone name identifying a first trust zone;

receiving a response from the Certificate Authority, wherein the response includes a list of trusted certificates for the first trust zone; and building a key file using the list of trusted certificates.

12. The method of claim 11, further comprising:

receiving a first trust zone password associated with the first trust zone; and encrypting the request using the first trust zone password before sending the request.

13. The method of claim 12, further comprising decrypting the response using the first trust zone password.

14. The method of claim 11, further comprising:

receiving an entity password associated with the first end entity; and encrypting the request using the entity password before sending the request.

15. The method of claim 14, further comprising decrypting the response using the entity password.

16. The method of claim 11, wherein the list of trusted certificates includes a first certificate for the first trust zone.

17. The method of claim 16, wherein the first certificate includes a public key for the first trust zone.

18. The method of claim 16, wherein the list of trusted certificates further includes a second certificate for a second zone that the first zone trusts.

19. The method of claim 18, wherein the second certificate includes a public key for the second trust zone.

20. The method of claim 16, wherein the list of trusted certificates further includes a certificate for a third party Certificate Authority.

21. A method in a Certificate Authority, for initializing an end entity, comprising:

in response to receiving, by a Certificate Authority, a request for a first list of trusted certificates corresponding to a bootstrap zone using Transmission Control Protocol, sending the first list of trusted certificates using Transmission Control Protocol; and in response to receiving, by a Certificate Authority, a request for a second list of trusted certificates for a target zone using Secure Sockets Layer protocol, sending the second list of trusted certificates using Secure Sockets Layer protocol.

22. An apparatus for automated trust zone partitioning in a Certificate Authority, comprising:

definition means for defining a Public Key Infrastructure comprising a plurality of trust zones;

association means for associating a first end entity with a first trust zone within the plurality of trust zones;

receipt means for receiving, by the Certificate Authority, a request from the first end entity for a certificate, wherein the request includes a first trust zone name identifying the first trust zone; and sending means for sending, by the Certificate Authority, a response to the first end entity, wherein the response includes a list of trusted certificates associated with the first trust zone, and wherein the Certificate Authority generates certificates for the first end entity based on a trust graph for the first trust zone.

23. The apparatus of claim 22, wherein the list of trusted certificates includes a first certificate for the first trust zone.

24. The apparatus of claim 23, wherein the list of trusted certificates further includes a second certificate for a second zone that the first zone trusts.

25. The apparatus of claim 23, wherein the list of trusted certificates further includes a certificate for a third party Certificate Authority.

26. An apparatus for automated trust zone partitioning in an end entity, comprising:

sending means for sending a request to a Certificate Authority for a certificate, wherein the request includes a trust zone name identifying a first trust zone;

receipt means for receiving a response from the Certificate Authority, wherein the response includes a list of trusted certificates for the first trust zone; and building means for building a key file using the list of trusted certificates.

27. The apparatus of claim 26, wherein the list of trusted certificates includes a first certificate for the first trust zone.

28. The apparatus of claim 27, wherein the list of trusted certificates further includes a second certificate for a second zone that the first zone trusts.

29. The apparatus of claim 26, wherein the list of trusted certificates further includes a certificate for a third party Certificate Authority.

30. A computer program product, in a computer readable recordable-type medium, for automated trust zone partitioning in a Certificate Authority, comprising:

instructions for defining a Public Key Infrastructure comprising a plurality of trust zones;

instructions for associating a first end entity with a first trust zone within the plurality of trust zones;

instructions for receiving, by the Certificate Authority, a request from the first end entity for a certificate, wherein the request includes a first trust zone name identifying the first trust zone; and instructions for sending, by the Certificate Authority, a response to the first end entity, wherein the response includes a list of trusted signer certificates associated with the first trust zone, and wherein the certificate Authority generates certificates for the first end entity based on a trust graph for the first trust zone.

31. A computer program product, in a computer readable recordable-type medium, for automated trust zone partitioning in an end entity, comprising:

instructions for sending a request to a Certificate Authority for a certificate, wherein the request includes a trust zone name identifying a first trust zone;

instructions for receiving a response from the Certificate Authority, wherein the response includes a list of trusted certificates for the first trust zone; and instructions for building a key file using the list of trusted certificates.

32. The method of claim 1, wherein policies between trust zones in the Public Key Infrastructure are specified as a trust graph and wherein certificates are issued based upon the trust graph.

33. The apparatus of claim 22, wherein policies between trust zones in the Public Key Infrastructure are specified as a trust graph and wherein certificates are issued based upon the trust graph.

* * * * *